United States Patent [19]

Mori et al.

[11] 4,362,983

[45] Dec. 7, 1982

[54] GENERATION CONTROL SYSTEM FOR VEHICLES

[75] Inventors: Kazumasa Mori, Aichi; Taro Asahi, Chiryu; Keiichiro Banzai, Toyota; Katsutaro Iwaki, Chiryu; Katsuya Muto, Kariya; Akira Mase, Handa; Takayasu Minura, Nagoya; Katsumi Itoh, Ohbu; Yoshio Akita, Ichinomiya, all of Japan

[73] Assignee: Nippondenso Co., Ltd., Kariya, Japan

[21] Appl. No.: 174,178

[22] Filed: Jul. 31, 1980

[30] Foreign Application Priority Data

Aug. 1, 1979 [JP] Japan .................................. 54-98527

[51] Int. Cl.³ ............................ H02J 7/16; H02P 9/00
[52] U.S. Cl. ........................................ 322/28; 320/64; 322/60; 322/99
[58] Field of Search ............... 320/61, 64, 68; 322/28, 322/59, 60, 72, 73, 99

[56] References Cited

U.S. PATENT DOCUMENTS

| | | | |
|---|---|---|---|
| 3,855,517 | 12/1974 | Allport | 322/28 X |
| 4,143,313 | 3/1979 | Arendt | 322/99 X |
| 4,297,631 | 10/1981 | Nicol et al. | 320/64 |

*Primary Examiner*—R. J. Hickey
*Attorney, Agent, or Firm*—Cushman, Darby & Cushman

[57] ABSTRACT

A generation control apparatus for vehicles comprises a voltage regulator circuit for controlling the generation of power by a vehicle generator. The power is supplied to the voltage regulator circuit through a first circuit including an ignition switch and a second circuit not including the ignition switch. The supply of power through the second circuit is dependent upon the generating condition of the generator thus allowing the control of the power generation by means of the current flowing through a charge indicator even if the detection of the power generation is prevented. In this way, even if a fault such as a break occurs in the first circuit, the generating operation is maintained until the engine is turned off and the generator has stopped.

7 Claims, 1 Drawing Figure

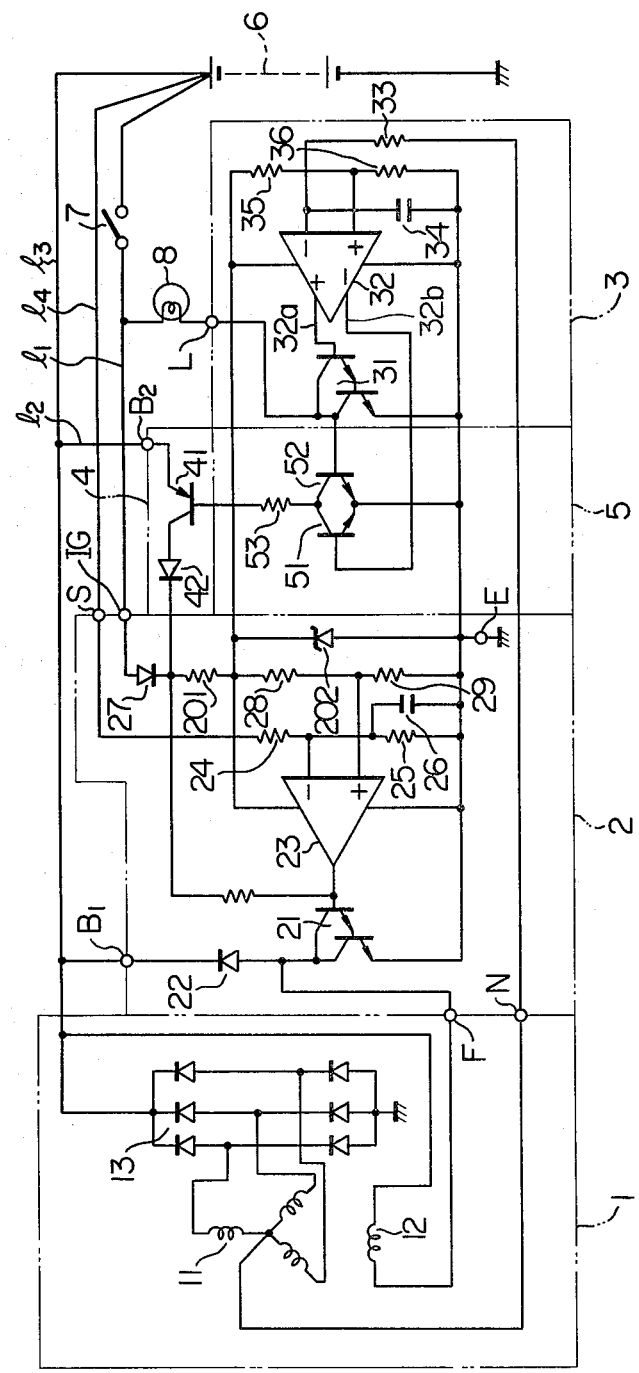

GENERATION CONTROL SYSTEM FOR VEHICLES

The present invention relates to generation control systems for vehicles.

It is an object of the present invention to provide an improved generation control system for vehicles which is so designed that the supply of power to a voltage regulator circuit for controlling the power generation of a vehicle generator is effected through two paths consisting of a first circuit for supplying the power through an ignition switch and a second circuit for supplying the power without passing through the ignition switch. The supply of the power through the second circuit is controlled in accordance with the power generating condition, whereas when the control of the supply of power in response to the power generating condition is rendered impossible due to any fault, the control is still effected by means of the current flowing through a charge indicator, whereby even if the first circuit, for example, is broken and made open due to a fault or the like during the generating operation, the power generation is still maintained at least up to the time that the engine is turned off to stop the generation.

The invention will be further described with reference to the accompanying drawing, in which:

The single-FIGURE drawing is a circuit diagram showing an embodiment of an apparatus according to the present invention.

The present invention will now be described in greater detail with reference to the illustrated embodiment.

In the FIGURE, numeral 1 designates a three-phase AC generator driven from the engine of a vehicle, comprising armature coils 11, an excitation coil 12 and a three-phase full-wave rectifier 13. Numeral 2 designates a voltage regulator circuit for controlling the excitation condition of the generator 1 comprising Darlington-connected power transistors 21, a counter-electromotive force absorbing diode 22, a comparator 23, battery voltage dividing resistors 24 and 25, a smoothing capacitor 26, reference voltage dividing resistors 28 and 29, and a resistor 201 and a Zener diode 202 for providing a constant voltage. Numeral 3 designates a generation indication circuit comprising lamp driving transistors 31, a comparator 32, an input resistor 33, a smoothing capacitor 34 and voltage dividing resistors 35 and 36 for generating a reference voltage. Numeral 4 designates an energizing circuit comprising a transistor 41 and a reverse current blocking diode 42, whereby the electric power is applied to the voltage regulator circuit 2 through a power supply path $l_1$ by way of a terminal IG as well as a charging output path $l_3$ (or a voltage detecting line $l_4$). Numeral 5 designates an energization control circuit comprising transistors 51 and 52 and a resistor 53 adapted to control the operation of the energizing circuit 4. Numeral 6 designates a vehicle battery, 7 an ignition switch, and 8 a generation indicating lamp or charge indicator lamp.

Next, the operation of the apparatus according to the invention will be described. Initially, during the time interal just following the closing of the ignition switch 7 when the generator is not generating as yet, the divisional voltage value of the battery voltage is still lower than the value of a reference voltage so that the output of the comparator 23 goes to a high level and the output transistors 21 are turned on, thus placing the generator 1 in the initial excitation condition. Also in the generation indication circuit 3 an output 32a of the comparator 32 goes to the high level so that the output transistors 31 are turned on and the lamp 8 is turned on. At this time, an output 32b of the comparator 32 goes to a low level so that the transistors 51 and 52 are turned off and the output transistor 41 of the energizing circuit 4 is turned off. Thus, the power is supplied to the voltage regulator circuit 2 through the terminal IG by way of the power supply path $l_1$ alone.

Thereafter, as the engine is started, the generation of power is started and the charging of the battery 6 is started, thus increasing the battery voltage.

When this occurs, in the voltage regulator circuit 2 the comparator 23 determines the magnitude of the divisional voltage value of the battery voltage applied from the battery 6 through the voltage detecting line and a terminal S relative to the reference voltage value, so that in response to the comparator output the power transistors 21 are turned on and off to control the power generation of the generator 1 and thereby to adjust the battery voltage to a predetermined set voltage determined by the reference voltage value. In this case, as the generated voltage increases, in the generation indication circuit 3 the output 32a of the comparator 32 goes to the low level and the output transistors 31 are turned off, thus turning off the lamp 8. Also, the output 32b of the comparator 32 goes to the high level and the transistors 51 and 52 of the energization control circuit 5 are turned on. Thus, the output transistor 41 of the energizing circuit 4 is turned on and the power is supplied to the voltage regulator circuit 2 by way of the two paths $l_1$ and $l_2$ through the terminals IG and $B_2$.

The operation of the apparatus will now be described with reference to the case where the power is no longer supplied to the voltage regulator circuit 2 through the path $l_1$ due to the breaking and opening of the path $l_1$ including the terminal IG and the ignition switch 7, particularly due to the disconnection, contact failure or the like of the terminal IG. Even in this case, the transistor 51 or 52 of the energization control circuit 5 is turned on so that the output transistor 41 of the energizing circuit 4 is always held on. Thus, the power is supplied to the voltage regulator circuit 2 through the terminal $B_2$ by way of the path $l_2$ and the voltage regulating operation is performed normally. On the other hand, if disconnection, contact failure or the like of a terminal L occurs during the power generating operation, due to the fact that the output 32b of the comparator 32 is at the high level, the transistors 51 and 41 are also held on and the voltage regulating operation is performed normally.

On the other hand, once the generator 1 stops generating, the breaking and opening of the path $l_1$ between the terminal IG and the ignition switch 7 results in the same operation as when the ignition switch 7 is turned off. However, if the path on the terminal L side is normal, even if the transistors 31 and the comparator 32 are off, the transistor 52 is turned on so that the transistor 41 of the energizing circuit 4 is turned on and the power is supplied to the voltage regulating circuit 2 through the terminal $B_2$. As soon as this occurs, the comparators 23 and 32 start operating and the respective circuits operate in the same manner as in the previously mentioned normal condition. However, if the path on the terminal L side is broken and opened simultaneously, while the power generating operation is maintained by virtue of the action of the energizing circuit 4 so far as the generator 1 is generating, once the generator 1 stops generating, it is impossible to restart the generating operation. In this case, the lamp 8 also goes out. If only the path on the terminal L side is broken and opened, while the generating operation is started again, the lamp 8 no longer lights and at least the driver is alerted to the fault.

While the generator output is taken from the neutral point of the generator for generation detecting purposes, the same may be taken directly from the armature coils 11. Further, the power may be supplied to the energizing circuit 4 by way of the voltage detecting line $l_4$ in place of the charging output path $l_3$.

We claim:

1. A generation control apparatus for vehicles having a generator, a battery and an ignition switch, said apparatus comprising:
   a voltage regulator circuit for controlling the generation of power by the generator;
   a first circuit for supplying electric power from the battery to said voltage regulator circuit through the ignition switch;
   a second circuit for supplying the electric power to said voltage regulator circuit without passing through said ignition switch;
   means for producing a generation signal indicative of the generating condition of said generator;
   a charge indicator connected to said battery through said ignition switch; and
   an energization control circuit for controlling the supply of said power through said second circuit in response to said generation signal and to a current flowing through said charge indicator when said ignition switch is turned on and when said charge indicator gives no indication of power generation.

2. An apparatus as set forth in claim 1, wherein the means for producing a generation signal includes a generation indication circuit including a comparator having first and second output terminals and adapted to compare an output voltage of said generator with a reference voltage such that a first output signal is generated from said first output terminal when said output voltage is lower than said reference voltage and a second output signal is generated as said generation signal from said second output terminal when said output voltage is higher than said reference voltage, and output transistor means having a terminal connected to said first output terminal of said comparator so as to be turned on in response to said first output signal to generate from a second terminal thereof a signal for actuating said charge indicator.

3. An apparatus as set forth in claim 2, wherein said energization control circuit includes a first transistor having a base connected to the second output terminal of said comparator in said generation indication circuit and being turned on in response to said second output signal, and a second transistor having a base connected to said second terminal of said output transistor means in said generation indication circuit so as to be turned on in response to the current which flows through said ignition switch and said charge indicator which is connected to said second terminal of said output transistor means when said ignition switch is closed and when said output transistor means is turned off, whereby when either of said first and second transistors is turned on, a control signal is generated for controlling the supply of the power through said second circuit.

4. An apparatus as set forth in claim 3, wherein said second circuit includes a transistor having a base connected to said energization control circuit so as to be turned on in response to said control signal from said energization control circuit and thereby to supply therethrough the electric power to said voltage regulator circuit.

5. A generation control apparatus for vehicles comprising:
   a battery mounted on a vehicle;
   a generator mounted on said vehicle and having a field winding and a current generating winding;
   a voltage regulating means connected to said battery and said field winding for controlling a field current flowing through said field winding in response to a battery voltage;
   an ignition switch connected between said battery and said voltage regulating means for supplying electric power to said voltage regulating means when said ignition switch is closed;
   a charge indicator connected to said battery through said ignition switch;
   an indication control means connected to said current generating winding and said charge indicator for energizing said charge indicator when the output from said current generating winding is below a predetermined value; and
   circuit means connected to and operated by said indication control means so that said circuit means is operated to supply the electric power from said battery to said voltage regulating means when the output supplied from said current generating winding to said indication control means exceeds said predetermined value, whereby when said voltage regulating means is not supplied with the electric power through said ignition switch because of a disconnection between said voltage regulating means and said battery, said voltage regulating means continues to regulate said field current.

6. A generation control apparatus as set forth in claim 5, wherein said indication control means comprises:
   a comparator having one input terminal to which the output from said current generating winding is applied, another input terminal to which a constant voltage corresponding to said predetermined value is applied and an output terminal; and
   transistor means having a base connected to said output terminal of said comparator and a collector connected to said charge indicator, said transistor means being made conductive when the output of said current generating winding is below said predetermined value.

7. A generation control apparatus as set forth in claim 6, wherein said comparator has a second output terminal, and wherein said circuit means comprises:
   a first transistor having a base connected to said collector of said transistor means, said first transistor being driven into conduction when said transistor means is not conductive;
   a second transistor having a base connected to said second output terminal of said comparator, said second transitor being driven into conductive when the output from said current generating winding exceeds said predetermined value; and
   a third transistor having a base connected to both collectors of said first and second transistors, an emitter-collector path of said third transistor connecting said voltage regulating means with said battery, said third transistor being driven into conductive when any one of said first and second transistors is conductive.

\* \* \* \* \*